United States Patent
Zhao et al.

(10) Patent No.: US 8,416,647 B1
(45) Date of Patent: Apr. 9, 2013

(54) OPTICAL TRANSDUCERS AND METHODS OF MAKING THE SAME

(75) Inventors: Yongjun Zhao, Eden Prairie, MN (US); Shuaigang Xiao, Freemont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 13/491,721

(22) Filed: Jun. 8, 2012

Related U.S. Application Data

(62) Division of application No. 13/248,927, filed on Nov. 10, 2011, now Pat. No. 8,286,329.

(51) Int. Cl.
*G11B 11/00* (2006.01)
(52) U.S. Cl. ............... 369/13.01; 369/13.17; 369/13.32
(58) Field of Classification Search .................. None
See application file for complete search history.

(56) References Cited

U.S. PATENT DOCUMENTS

| | | | |
|---|---|---|---|
| 7,894,308 B2* | 2/2011 | Peng et al. | 369/13.33 |
| 2005/0078565 A1* | 4/2005 | Peng et al. | 369/13.32 |
| 2010/0104768 A1 | 4/2010 | Xiao | |
| 2010/0123965 A1 | 5/2010 | Lee | |
| 2010/0214685 A1 | 8/2010 | Seigler | |
| 2010/0321814 A1* | 12/2010 | Zou et al. | 360/59 |

\* cited by examiner

*Primary Examiner* — Joseph Haley
*Assistant Examiner* — Henok Heyi
(74) *Attorney, Agent, or Firm* — Mueting Raasch & Gebhardt

(57) ABSTRACT

A near field transducer (NFT) that includes a disk, the disk having a top surface, a side surface, and a center; a peg, the peg positioned adjacent the side surface of the disk; and a heat sink, the heat sink positioned on the top surface of the disk, and the heat sink having an effective center, wherein the NFT has a peg axis, which is defined by the location of the peg adjacent the side surface of the disk, and a non-peg axis, which is perpendicular to the peg axis, and wherein the effective center of the heat sink is positioned at about the center of the disk.

20 Claims, 8 Drawing Sheets

OPTICAL TRANSDUCERS AND METHODS OF MAKING THE SAME

RELATED APPLICATION

This application is a divisional of U.S. application Ser. No. 13/248,927 filed Nov. 10, 2011. The entire disclosure of this application is incorporated herein by reference.

BACKGROUND

"Heat assisted magnetic recording," optical assisted recording or thermal assisted recording (collectively hereinafter HAMR), generally refers to the concept of locally heating a recording medium to reduce the coercivity of the recording medium so that an applied magnetic writing field can more easily affect magnetization of the recording medium during a temporary magnetic softening of the recording medium caused by the local heating. HAMR allows for the use of small grain media, which is desirable for recording at increased areal densities, with a larger magnetic anisotropy at room temperature assuring a sufficient thermal stability. HAMR can be applied to any type of storage media, including for example, tilted media, longitudinal media, perpendicular media, and/or patterned media.

To locally heat up the media in HAMR, optical transducers, such as near field transducers (NFTs) are often incorporated into the head in order to focus laser light to a nanometer sized area. An NFT is able to confine light far beyond the diffraction limit by generating localized surface Plasmon (LSP).

The feature size of NFTs in a HAMR head is normally very small in order to get the right resonance frequency, thermal spot size and high coupling efficiency. For a "lollipop" shaped NFT, the disk size is often only about 200 nm in diameter. NFTs are often embedded in waveguide materials, which couple the laser light onto the NFT from outside. Waveguide materials normally have very poor thermal conductance. All of these factors result in enormous temperature increases at the region of the NFT, much higher than what thermal recording requires. This can lead to overheating and exceedingly elevated temperatures which can lead to reliability issues for HAMR heads. Therefore, there remains a need for NFTs that are less susceptible to overheating.

SUMMARY

Disclosed herein is a near field transducer (NFT) that includes a disk, the disk having a top surface, a side surface, and a center; a peg, the peg positioned adjacent the side surface of the disk; and a heat sink, the heat sink positioned on the top surface of the disk, and the heat sink having an effective center, wherein the NFT has a peg axis, which is defined by the location of the peg adjacent the side surface of the disk, and a non-peg axis, which is perpendicular to the peg axis, and wherein the effective center of the heat sink is positioned at about the center of the disk.

Also disclosed herein is a near field transducer (NFT) that includes a disk, the disk having a top surface, a side surface, and a center; a peg, the peg positioned adjacent the side surface of the disk; and a heat sink, the heat sink including a main portion and a tip portion, and the heat sink being positioned on the top surface of the disk, wherein the NFT has a peg axis, which is defined by the location of the peg adjacent the side surface of the disk, and a non-peg axis, which is perpendicular to the peg axis, and wherein the tip portion of the heat sink is located substantially in the direction of the peg axis.

Also disclosed herein is a method that includes forming a first photoresist mask on a substrate, the first photoresist mask having inside edges, the inside edges of the first photoresist mask defining a first aperture, the first aperture having a first maximum width; forming a second photoresist mask on the first photoresist mask, the second photoresist mask having inside edges, the inside edges of the second photoresist mask defining a second aperture, wherein the second aperture has a second maximum width that is smaller than the first maximum width; depositing near field transducer (NFT) material in at least the second aperture; directionally depositing a cover material on at least the inside edges of the first and second photoresist masks forming a third aperture, the third aperture having a third maximum width, the third maximum width being smaller than the second maximum width; depositing heat sink materials in at least the third aperture; and removing at least a portion of the first photoresist mask, at least a portion of the second photoresist mask, at least a portion of the NFT material, at least a portion of the cover material, and at least a portion of the heat sink material.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
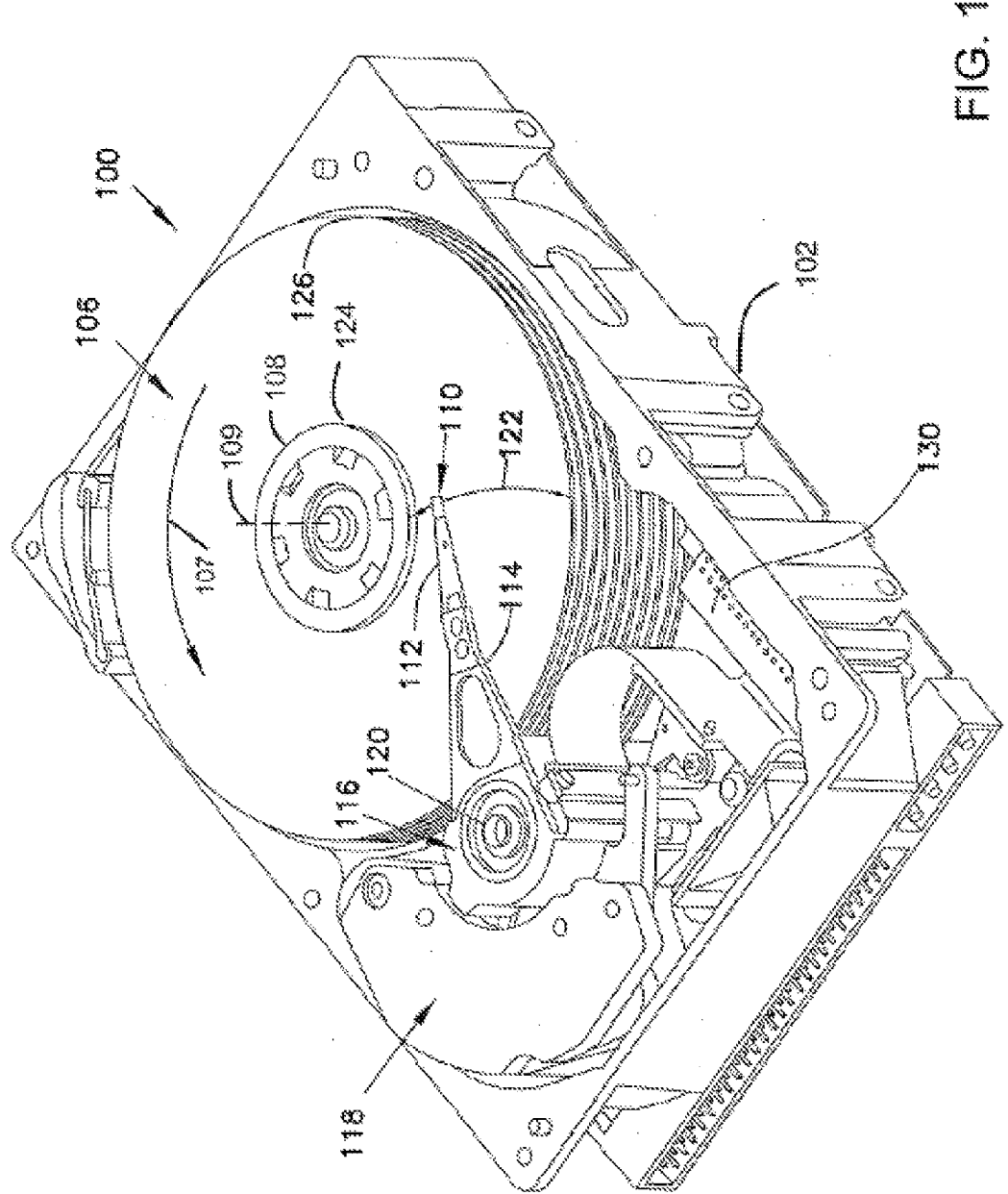
FIG. 1 illustrates a plan view of an example disc drive.

FIG. 1 is an isometric view of a disc drive 100 in which the presently disclosed optical transducers are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction 107 about a central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown). Disc drives 100 and heads 110 such as those illustrated in FIG. 1 can include optical transducers, such as a near field transducer (NFT) (not shown in FIG. 1), including those disclosed and described herein.

Figure 2A:
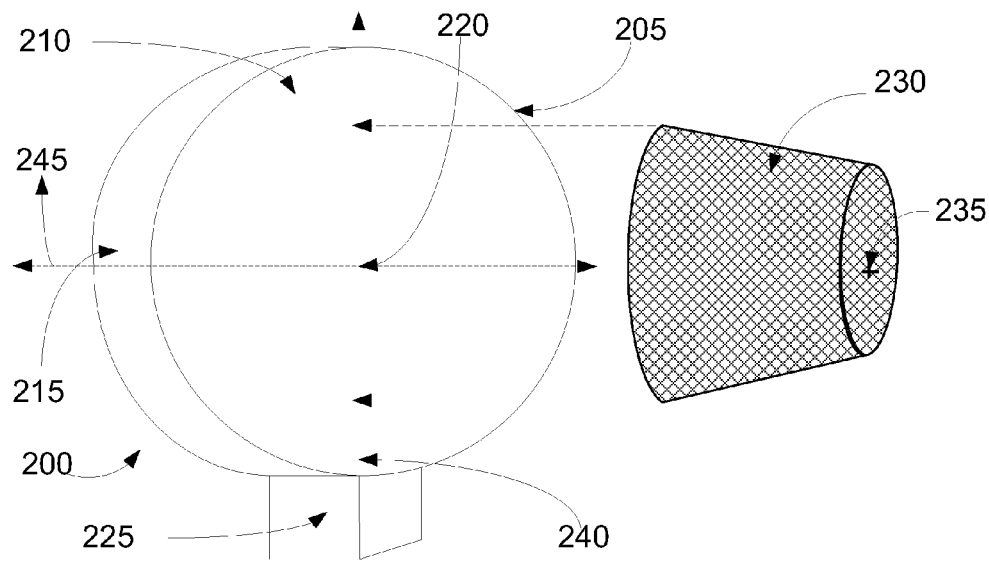
FIGS. 2A, 2B, and 2C illustrate an exemplary partial isometric view of a near field transducer (NFT) (FIG. 2A), a top down view of the exemplary NFT (FIG. 2B); and a top down view of another exemplary NFT (FIG. 2C)

FIG. 2A illustrates an exemplary partial isometric view of a near field transducer (NFT). This exemplary NFT has what is commonly referred to as the "lollipop" structure. The NFT 200 includes a disk 205. The disk is generally made of a plasmonic material. Exemplary materials that can be utilized for the disk 205 include, for example, gold (Au), silver (Ag), copper (Cu), aluminum (Al), and alloys thereof. In exemplary embodiments, alloys of gold, including those discussed in co-pending, commonly assigned U.S. patent application Ser. No. 13/032,709, filed on Feb. 23, 2011; can be utilized. The disk 205 has a top surface 210 and a side surface 215. The disk may also be described as having a bottom surface that is opposite the top surface 210 and is not shown in FIG. 2A. The disk 205 also has a center 220.

An NFT 200 also includes a peg 225. The peg 225 can be generally positioned adjacent the side surface 215 of the disk 205. If the NFT is described as having a "lollipop" structure, the peg can be described as the stick of the lollipop. The peg 225 can, but need not, be made of the same material as the disk 205. In embodiments, the disk 205 and the peg 225 are one continuous structure that was deposited simultaneously.

An NFT 200 also includes a heat sink 230. The heat sink 230 can be positioned on the top surface 210 of the disk 205. Generally, the heat sink 230 is positioned in the middle of the top surface 210 of the disk 205. The heat sink 230 has an effective center 235. The effective center 235 is the center of the portion of the heat sink 230 without any protrusions (none shown in FIG. 2A, as opposed to FIG. 2C). If the heat sink 235 is a perfect conical frustum (a portion of a solid, such as a cone, that lies between two parallel planes cutting it), the effective center is the center of the conical frustum.

The heat sink 230 can be made of any plasmonic material. In embodiments, the heat sink can be made of gold (Au), silver (Ag), copper (Cu), aluminum (Al), and alloys thereof.

The heat sink 230 and the disk 205 can be made of the same or different materials. Generally, the heat sink 230 has to have a thickness that is great enough that it can contact the write pole (another structure within the head). In embodiments, the heat sink 230 can have a thickness of about 130 nm.

The NFT 200 can also be described as having a peg axis 240, which can be defined by the location of the peg 225 adjacent the side surface 215 of the disk 205. In an embodiment, the peg axis 240 can be defined by a plane that cuts the disk 205 and the peg 225 in half perpendicular to a substrate upon which they are located. Perpendicular to the peg axis is the non-peg axis 245.

In embodiments, the effective center 235 of the heat sink 230 is positioned at about the center 220 of the disk 205. As can be seen from FIG. 2A, if the heat sink 230 were to be placed back on the top surface 210 of the disk 205 (by following the two arrows in FIG. 2A), the effective center 235 of the heat sink 230 would be positioned at about the center 220 of the disk 205. In embodiments, at about the center 220 of the disk 205 means that the effective center 235 of the heat sink 230 is centered at the center 220 of the disk 205. In embodiments, the effective center 235 of the heat sink 230 and the center 220 of the disk 205 are not more than about 8 nm apart; in embodiments not more than about 6 nm apart; and in embodiments not more than about 5 nm apart.

Figure 2B:
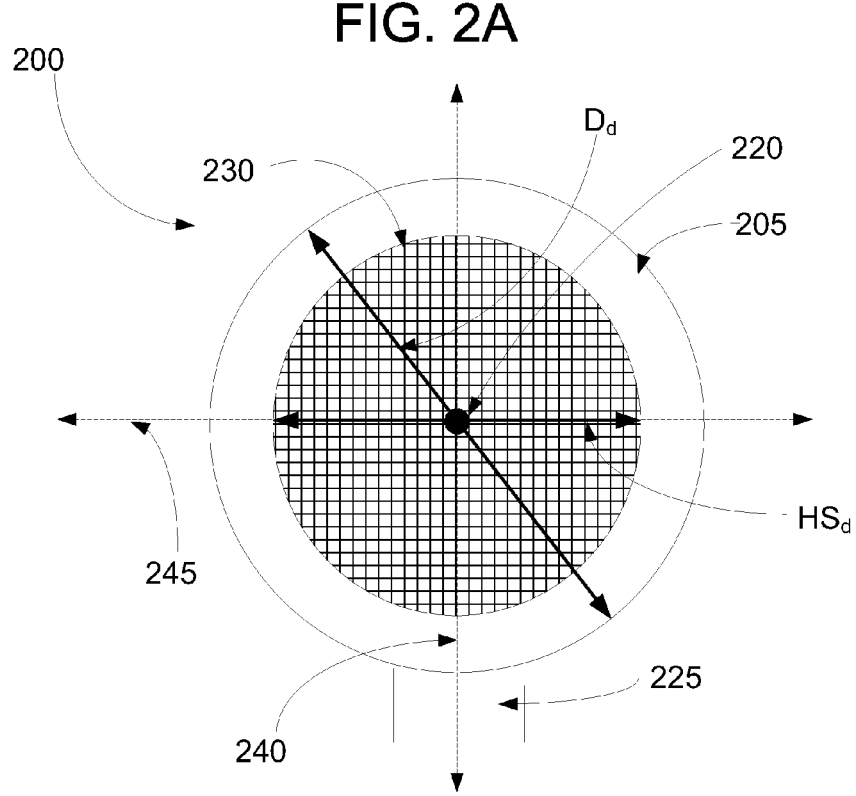

FIG. 2B shows a top down view of the NFT 200. Like components are numbered similarly to FIG. 2A. The NFT 200 in FIG. 2B shows the diameter of the disk $D_d$ and the effective diameter of the heat sink $HS_d$. The heat sink 230 has an effective diameter $HS_d$, the effective diameter is relevant to the surface of the heat sink 230 that is adjacent the disk 205, not the top surface of the heat sink. The effective diameter $HS_d$ is the diameter of the portion of the heat sink 230 without any protrusions (none shown in FIG. 2A, as opposed to FIG. 2C). If the heat sink 235 is a perfect conical frustum, the effective diameter is the diameter of the conical frustum. In embodiments, the diameter of the disk $D_d$ can range from about 150 nm to about 350 nm; in embodiments from about 225 nm to about 275 nm; in embodiments from about 240 nm to about 260 nm; and in embodiments it is about 250 nm. In embodiments, the effective diameter of the heat sink $HS_d$ can range from about 100 nm to about 300 nm; in embodiments from about 175 nm to about 225 nm; in embodiments from about 190 nm to about 210 nm; and in embodiments it is about 200 nm.

Figure 2C:
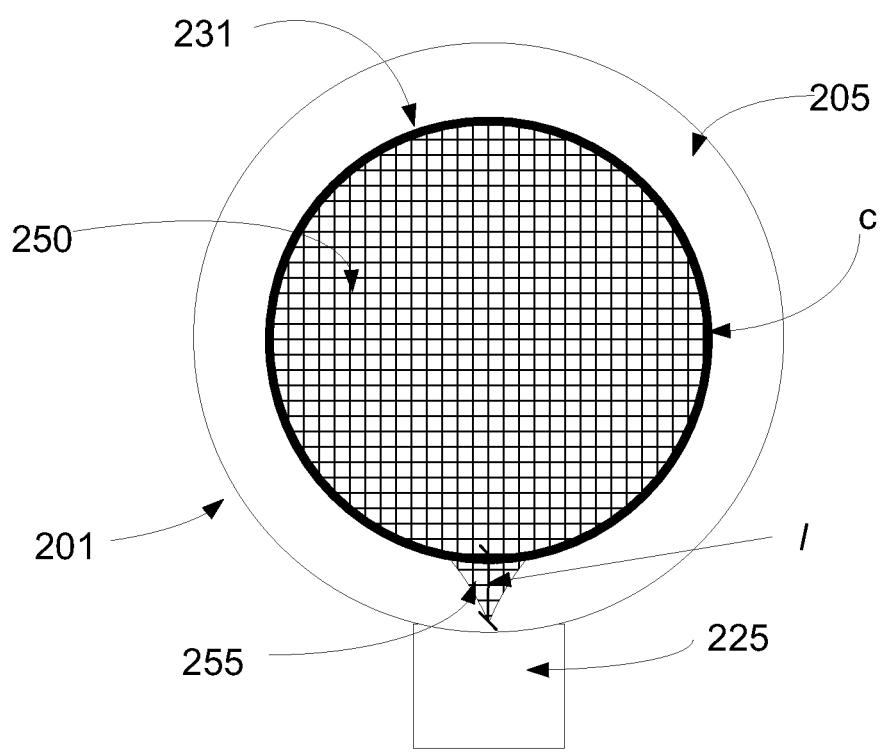

FIG. 2C shows a top down view of an NFT 201 that includes a heat sink 231 that includes a main portion 250 and a tip portion 255. The tip portion 255, when included, can be located in the region of the peg 225. In embodiments, the tip portion 255 can be located proximate the peg 225. The tip portion 255 is the portion of the heat sink 231 that extends from the conical frustum portion of the heat sink 231. The conical frustum portion of the heat sink 231 can be defined as the portion within the circumference c. Generally, the tip portion 255 has a substantially triangular shape and extends away from the main portion 250 or the conical frustum portion of the heat sink 231. The portion of the tip portion 255 that extends away from the main portion 250 can be described as having a length l, or extending away a certain distance. In embodiments, the tip portion can extend away from the main portion about 5 nm to about 25 nm; or about 10 nm to about 20 nm.

Methods of forming optical transducers, such as NFTs are also described herein. It should also be noted that methods disclosed herein can be utilized to make features and/or portions of devices having any shapes, not just circular shapes. Although exemplary methods are illustrated herein using circular shapes, this should not be taken as limiting of feature shapes that can be formed using disclosed methods. FIGS. 3A-3G illustrate an exemplary article at various stages of manufacture. Each of FIGS. 3A-3G contains three figures, the one on the left is a cross section of the portion of the article that eventually makes up the disk portion of the device; the one in the middle is a cross section of the portion of the article that eventually makes up the peg portion of the device; and the one on the right is a top down view of the whole article.

Figure 3A:
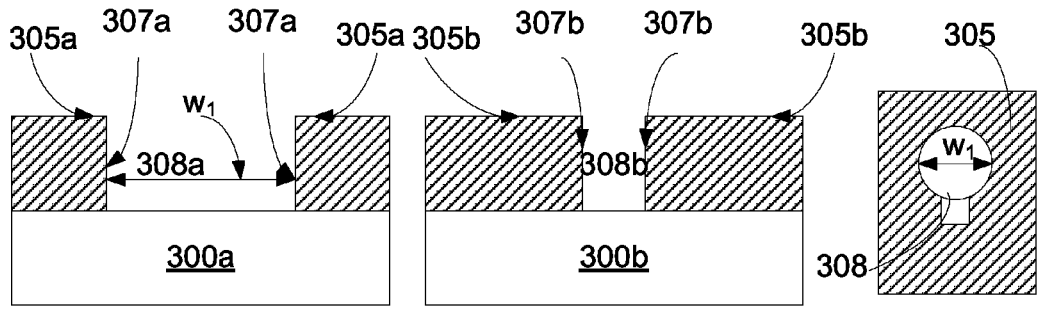
FIGS. 3A-3G show an article at various stages of a disclosed method to form a NFT.

FIG. 3A shows a substrate 300a upon which a first photoresist mask 305 has been formed. The photoresist mask 305 has inside edges 307, which define a first aperture 308. The first aperture 308 can be described as having a circular portion 308a connected to a rectangular portion 308b. The first aperture 308 can also be described as having a width $w_1$. Generally, the width $w_1$ can be at least about 100 nm larger than the diameter of the disk that is being formed. In embodiments, the width $w_1$ can be from about 150 nm to about 500 nm, or about 250 nm to about 400 nm. The maximum width of the first aperture 308 can generally be limited to a width that will afford structural integrity so that the second photoresist mask (discussed below) won't collapse.

Figure 3B:
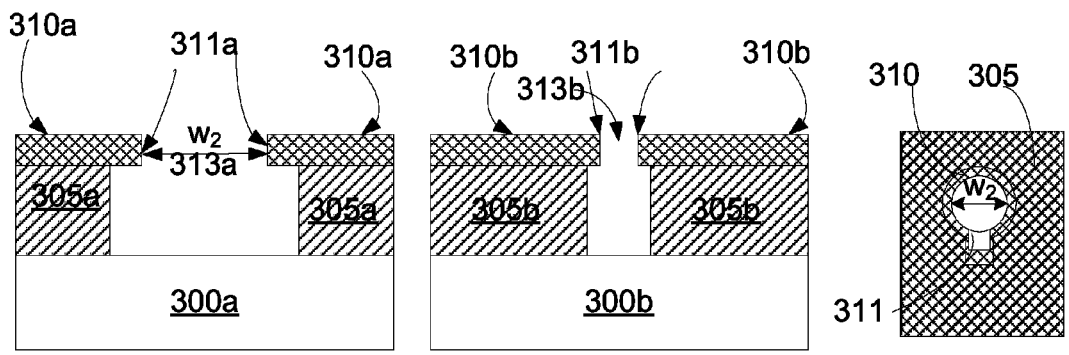

FIG. 3B illustrates the article after completion of the next step, formation of a second photoresist mask 310 on the first photoresist mask 305. The second photoresist mask 310 has inside edges 311 that define a second aperture 313. The second aperture 313 can be described as having a circular portion 313a connected to a rectangular portion 313b. The second aperture 313 can also be described as having a width $w_2$. The width $w_2$ of the second aperture 313 is less than or smaller than the width $w_1$ of the first aperture 308. Generally, the second width $w_2$ can range from about 150 nm to about 350 nm.

The materials of the first photoresist mask 305 and the second photoresist mask 310 can be those generally utilized, including for example polymethylmethacryalte (PMMA), or high performance electron beam resists such as ZEP520 (Zeon Corporation, Tokyo, Japan). The techniques used to form the first and second apertures 308 and 313 are also generally known and include formation of layers, masking, and exposing steps.

Figure 3C:
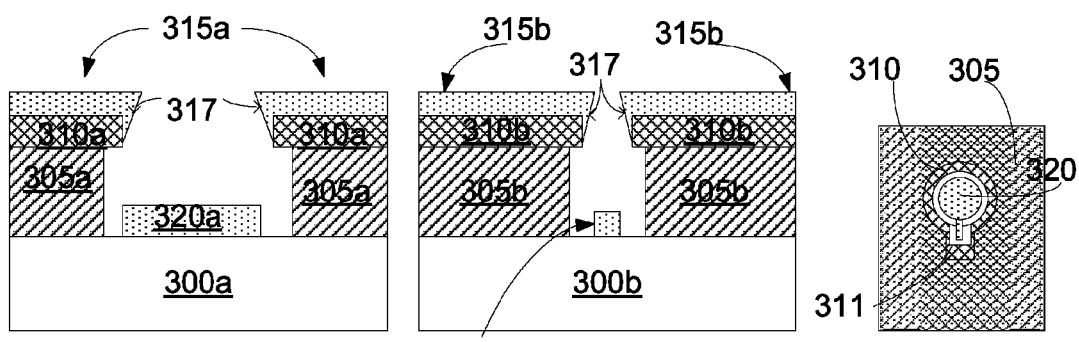

FIG. 3C shows the article after the next step, deposition of the NFT material 315. The NFT material can be deposited in at least the second aperture 313. The NFT material 315 can be deposited so that it coats at least a portion of the top surfaces of the second photoresist mask 310. The NFT material 315 can also form inside edges 317 on the inside edges 311 of the second photoresist mask 310. Once the NFT material 315 is deposited in the second aperture 313 it will generally form what will ultimately become the disk 320a and the peg 320b. Completion of this step can form at least a disk portion of a NFT (a peg portion of a NFT can also be formed). The disk portion will have a center (as discussed above).

The NFT material can generally be any plasmonic material. Exemplary materials that can be utilized for the NFT material include, for example, gold (Au), silver (Ag), copper (Cu), aluminum (Al), and alloys thereof. In exemplary embodiments, alloys of gold, including those discussed in co-pending, commonly assigned U.S. patent application Ser. No. 13/032,709, filed on Feb. 23, 2011; can be utilized. The NFT material 315 can be deposited using any commonly utilized techniques including for example E-beam evaporation, Ion beam deposition, chemical vapor deposition (CVD), physical vapor deposition (PVD). In embodiments, the NFT material 315 can be deposited using E-beam evaporation.

Figure 3D:
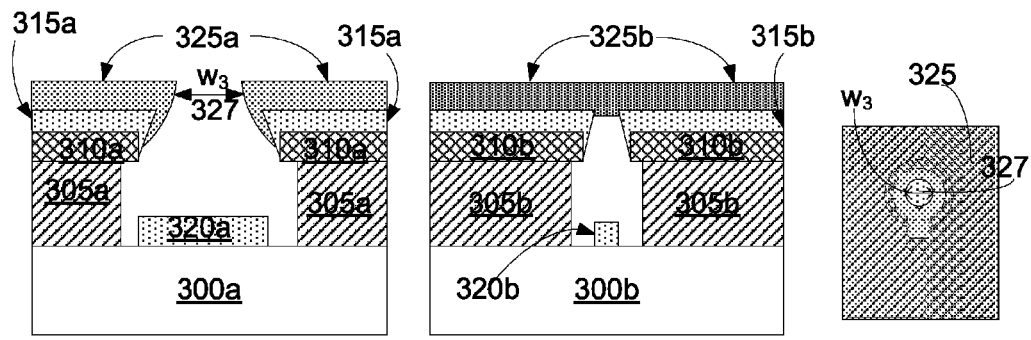

FIG. 3D shows the article after completion of the next step, directionally depositing a cover material 325 on at least the inside edges of at least the NFT material 315. In embodiments, the cover material 325 can be deposited on the inside edges 317 of the NFT material 315, the inside edges 311 of the second photoresist mask 310, the inside edges 307 of the first photoresist mask 305, and at least a portion of the NFT material 315. Deposition of the cover material 325 defines a third aperture 327. The third aperture 327 can be described as having only a substantially circular portion. The cover material 325 can be deposited in such a way that it sealed the rectangular shaped portion of the second aperture (as seen in the middle portion of FIG. 3D). This ultimately allows the peg of the NFT to have a thickness that is unchanged by further deposition steps, because the heat sink material will not be deposited on the peg area of the disk material. The third aperture 327 can also be described as having a width $w_3$. The width $w_3$ of the third aperture 327 is less than or smaller than the widths $w_1$ and $w_2$, of both the first and second apertures 308 and 313. Generally, the third maximum width $w_3$ can range from about 100 nm to about 300 nm.

Figure 3E:
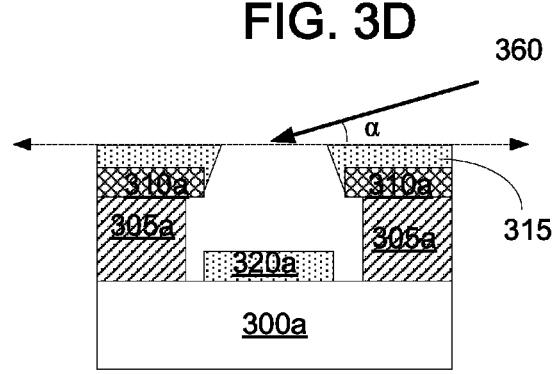

FIG. 3E further illustrates directional deposition. In directional deposition, the direct source of the deposited material (for example an ion beam in ion beam deposition (IBD), or an E-beam in E-beam evaporation) is not located directly above the article upon which it is to be deposited, but at an angle from the surface. Directional deposition can be further described by describing the angle of deposition. As seen in FIG. 3E, the surface of the NFT material 315 defines a plane (as shown by the dashed line), the directional deposition of this step can be carried out an angle $\alpha$ from the surface of the NFT material 315. In embodiments, the angle $\alpha$ can be less than or equal to about 60°; or less than or equal to about 45°; or less than or equal to about 35°; or about 30°.

Directional deposition can be carried out using various deposition techniques, including for example directional ion beam deposition (IBD), E-beam evaporation. The material that can be deposited in this step is not generally limited, and can be most any material. Exemplary materials that can be deposited in this step include, for example, copper (Cu), gold (Au), or aluminum (Al). The directionality of the deposition can be obtained by tilting the wafer, tilting the ion beam (in the case of IBD), or a combination thereof.

Figure 3F:
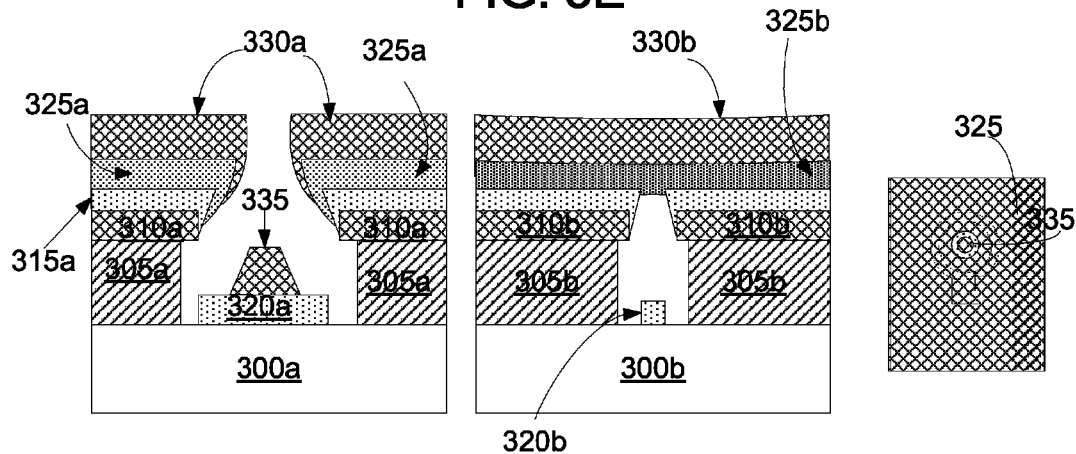

FIG. 3F shows the article after completion of the next step, deposition of a heat sink material 330. The heat sink material 330 can generally be deposited in at least the third aperture 327. In embodiments, the heat sink material 330 can be deposited in the third aperture 327 and on at least part of the surface of the cover material 325. Once the heat sink material 330 is deposited in the third aperture 327 it will generally form what will ultimately become the heat sink 335. The heat sink material can generally be any plasmonic material (for example Cu, Ag, Au, Al, or alloys thereof). Because of the way in which the cover material 325 and the NFT material 315 are deposited on the inside edges of various structures, the heat sink 335 will generally have a substantially conical frustum shape. The heat sink 335 need not be exactly a conical frustum, but it can have the general shape of a conical frustum. Because of the covering of the rectangular shaped portion (or peg portion) of the second aperture 313, the heat sink 335 can have a portion that extends out from the substantially conical frustum shape towards the rectangular shaped portion of the second aperture 313; this portion of the heat sink 335 can be referred to as the tip portion (as discussed above). Completion of this step can form a heat sink, which can be characterized as having an effective center (as discussed above with respect to FIG. 2A). In embodiments, the effective center of the heat sink and the center of the disk can be not more than 10 nm apart, not more than 8 nm apart, or not more than 5 nm apart.

Figure 3G:
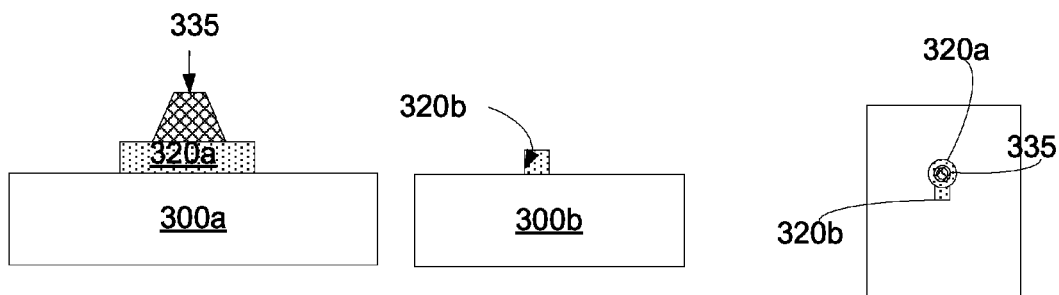

FIG. 3G shows the article after completion of the next step, removal of some of the structures. In embodiments, at least a portion of the heat sink material 330, at least a portion of the cover material 325, at least a portion of the NFT material 315, at least a portion of the second photoresist mask 310, at least a portion of the first photoresist mask 305, or some combination thereof can be removed during this step. In embodiments, at least a portion of the heat sink material 330, at least a portion of the cover material 325, at least a portion of the NFT material 315, at least a portion of the second photoresist mask 310, and at least a portion of the first photoresist mask 305 can be removed during this step. In embodiments, at least a portion of the heat sink material 330, substantially of the cover material 325, at least a portion of the NFT material 315, substantially all of the second photoresist mask 310, and substantially all of the first photoresist mask 305 can be removed during this step. In embodiments, substantially all of the heat sink material 330 except that which formed the heat sink 335, substantially of the cover material 325, substantially all of the NFT material 315 except that which formed the disk 320, substantially all of the second photoresist mask 310, and substantially all of the first photoresist mask 305 can be removed during this step. Removal of the various layers can be accomplished using commonly utilized techniques, including, for example chemical etching, reactive ion etching (RIE), chemical mechanical polishing (CMP). In embodiments, a single liftoff process can remove all of the material deposited during the method except that which formed the disk, peg, and heat sink.

NFTs disclosed herein and methods of forming them can provide NFTs with heat sinks that are more advantageously aligned with the disk of the NFT. This can be advantageous because the coupling efficiency of the heat sink to the disk of the NFT can be better when it is better aligned. Processes described herein can also be further advantageous because they offer less processing steps than other methods.

EXAMPLE

While the present disclosure is not so limited, an appreciation of various aspects of the disclosure will be gained through a discussion of the example provided below.

Figure 4A:
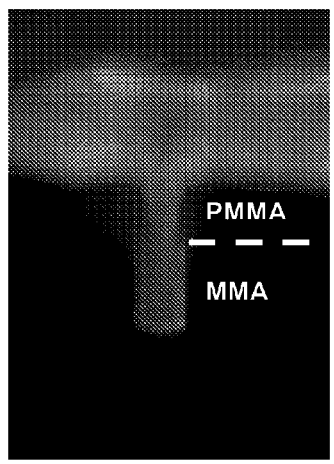
FIGS. 4A-4I show images of a NFT at various stages of the process that was fabricated using an exemplary disclosed method.

A first photoresist layer was deposited on a substrate by spin-coating MMA EL9 (9% MMA (methyl methacrylate) in ethyl lactate purchased from MicroChem Corp., Newton, Mass.) 200-500 nm thick. The coated MMA EL9 was then baked at about 180° C. for about three minutes. Next, the second photoresist layer was deposited on the first photoresist layer by spin-coating MW 495k polymethylmethacrylate (PMMA) on the MMA EL9 at about 30 to 200 nm thick. The article was then baked at about 180° C. for about three minutes. The article was then exposed to E-beam radiation using a Gaussian beam system (Vistec VB6, Vistec Lithography, Inc. Watervliet, N.Y.) operating at 100 kV and 5-10 nA. The dose used in the peg area was about 2000 $\mu C/cm^2$ (a single beam pass was applied in order to achieve as narrow a peg width as possible) and the dose used in the disk area was about 1000 $\mu C/cm^2$. The first and second photoresist layers were then developed with a mixed solvent of methyl isobutyl ketone (MIBK) and isopropanol (IPA) (MIBK:IPA=1:3 in volume) and then rinsed with IPA. FIG. 4A shows a cross section of the article after completion of this step.

Figure 4B:
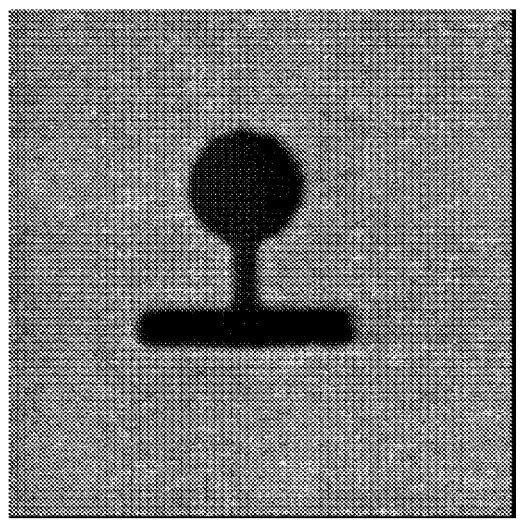
Figure 4C:
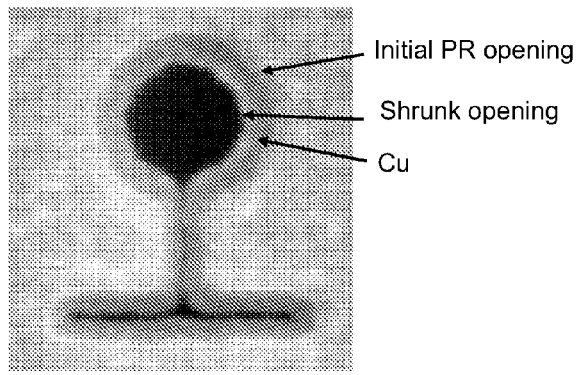
Figure 4D:
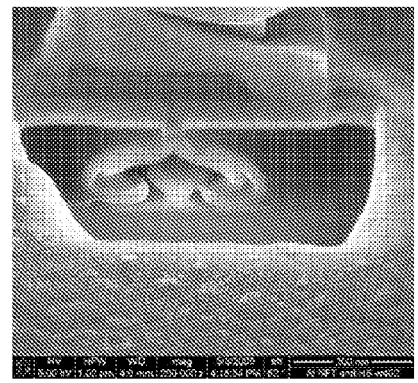

Next, the NFT material, gold (Au) was deposited in an evaporator. The gold was deposited to a thickness of about 20 nm to about 30 nm. FIG. 4B shows the article after completion of this step. After that, copper (Cu) was deposited at a 30° angle using IBD. The Cu was deposited to a thickness of about 40 nm. FIG. 4C shows a top view of the article after completion of this step; and FIG. 4D shows a cross section view at the peg area.

Figure 4E:
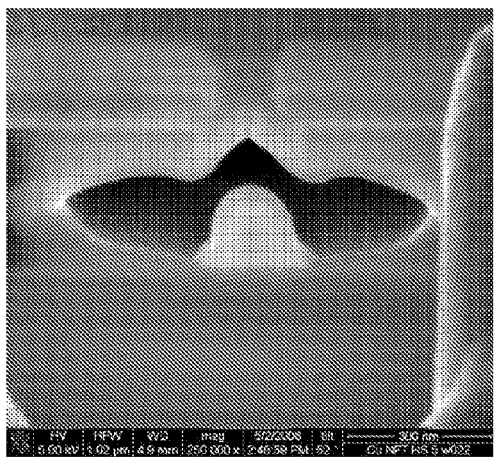
Figure 4F:
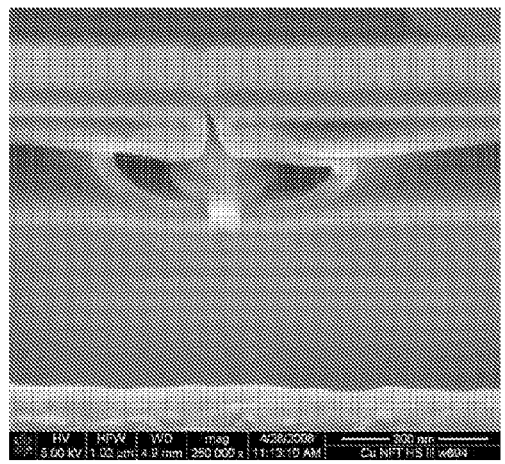
Figures 4G, 4H, 4I:
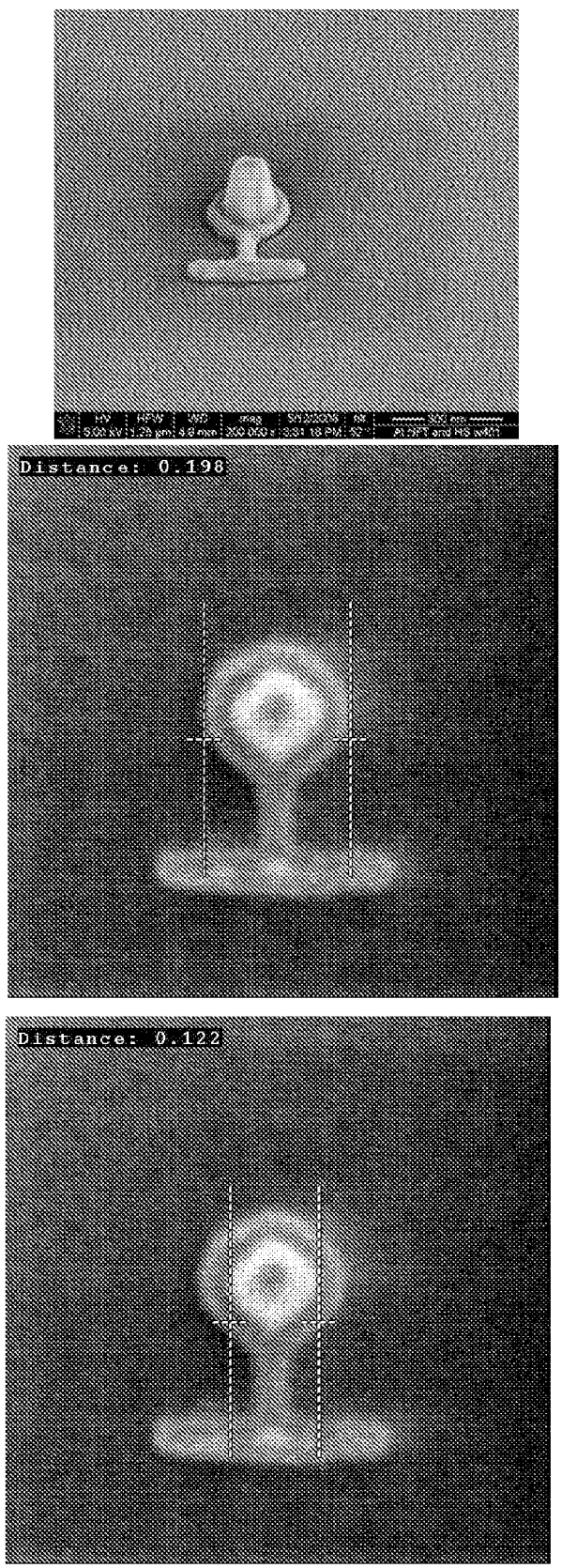

Next, the heat sink material, gold (Au) was deposited using IBD to a thickness of about 130 nm. FIG. 4E shows a cross section at the disk area and FIG. 4F shows a cross section at the peg area. Next, everything but the NFT (the disk and the peg) and the heat sink were lifted off. FIG. 4G shows a perspective view of the article; FIG. 4H shows the diameter of the disk, 0.198 micrometers; and FIG. 4I shows the diameter of the heat sink 0.122 micrometers.

Thus, embodiments of LIGHT DELIVERY WAVEGUIDES are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A near field transducer (NFT) comprising:
    a disk, the disk having a top surface, a side surface, and a center;
    a peg, the peg positioned adjacent the side surface of the disk; and
    a heat sink, the heat sink positioned on the top surface of the disk, and the heat sink having an effective center,
    wherein the NFT has a peg axis, which is defined by the location of the peg adjacent the side surface of the disk, and a non-peg axis, which is perpendicular to the peg axis, and
    wherein the effective center of the heat sink is positioned at about the center of the disk.

2. The NFT according to claim 1, wherein the effective center of the heat sink and the center of the disk are not more than 8 nm apart in the direction of the non-peg axis.

3. The NFT according to claim 1, wherein the effective center of the heat sink and the center of the disk are not more than 6 nm apart in the direction of the non-peg axis.

4. The NFT according to claim 1, wherein the effective center of the heat sink and the center of the disk are not more than 5 nm apart in the direction of the non-peg axis.

5. The NFT according to claim 1, wherein the heat sink comprises main portion and a tip portion, the tip portion being located proximate the peg.

6. The NFT according to claim 1, wherein the disk and the peg are a continuous structure.

7. The NFT according to claim 1, wherein the disk has a diameter of about 250 nm and the heat sink has an effective diameter of about 200 nm.

8. The NFT according to claim 1, wherein the disk and the peg comprise gold (Au), silver (Ag), copper (Cu), aluminum (Al), or alloys thereof.

9. The NFT according to claim 1, wherein the heat sink comprises gold (Au), silver (Ag), copper (Cu), aluminum (Al), or alloys thereof.

10. A near field transducer (NFT) comprising:
    a disk, the disk having a top surface, a side surface, and a center;
    a peg, the peg positioned adjacent the side surface of the disk; and
    a heat sink, the heat sink comprising a main portion and a tip portion, and the heat sink being positioned on the top surface of the disk, wherein the NFT has a peg axis, which is defined by the location of the peg adjacent the side surface of the disk, and a non-peg axis, which is perpendicular to the peg axis, and wherein the tip portion of the heat sink is located substantially in the direction of the peg axis.

11. The NFT according to claim 10, wherein the main portion of the heat sink has a circumference and the tip portion extends from about 5 nm to about 25 nm away from the circumference.

12. The NFT according to claim 10, wherein the main portion of the heat sink has a circumference and the tip portion extends from about 10 nm to about 20 nm away from the circumference.

13. The NFT according to claim 10, wherein the main portion of the heat sink has a center, and wherein the center of the main portion of the heat sink is positioned at about the center of the disk.

14. The NFT according to claim 13, wherein the center of the main portion of the heat sink and the center of the disk are not more than 8 nm apart in the direction of the non-peg axis.

15. The NFT according to claim 13, wherein the center of the main portion of the heat sink and the center of the disk are not more than 5 nm apart in the direction of the non-peg axis.

16. The NFT according to claim 10, wherein the disk and the peg comprise gold (Au), silver (Ag), copper (Cu), aluminum (Al), or alloys thereof.

17. The NFT according to claim 10, wherein the heat sink comprises gold (Au), silver (Ag), copper (Cu), aluminum (Al), or alloys thereof.

18. A disc drive comprising:
    a magnetic head comprising:
        a near field transducer (NFT) comprising:
            a disk, the disk having a top surface, a side surface, and a center;
            a peg, the peg positioned adjacent the side surface of the disk; and
            a heat sink, the heat sink positioned on the top surface of the disk, and the heat sink having an effective center,
            wherein the NFT has a peg axis, which is defined by the location of the peg adjacent the side surface of the disk, and a non-peg axis, which is perpendicular to the peg axis, and
            wherein the effective center of the heat sink is positioned at about the center of the disk.

19. The disc drive according to claim 18, wherein the effective center of the heat sink and the center of the disk are not more than 6 nm apart in the direction of the non-peg axis.

20. The disc drive according to claim 18, wherein the disk has a diameter of about 250 nm and the heat sink has an effective diameter of about 200 nm.

* * * * *